United States Patent
Feenstra et al.

(10) Patent No.: US 7,801,476 B2
(45) Date of Patent: Sep. 21, 2010

(54) SOFTWARE SIGNAL RECEIVER

(75) Inventors: Sean D Feenstra, Dakota City, NE (US); David W. Anderson, Sergeant Bluff, IA (US)

(73) Assignee: Gateway, Inc., Irvine, CA (US)

( * ) Notice: Subject to any disclaimer, the term of this patent is extended or adjusted under 35 U.S.C. 154(b) by 1336 days.

(21) Appl. No.: 10/930,561

(22) Filed: Aug. 31, 2004

(65) Prior Publication Data

US 2005/0064831 A1   Mar. 24, 2005

Related U.S. Application Data

(60) Provisional application No. 60/500,494, filed on Sep. 5, 2003.

(51) Int. Cl.
   *H04H 1/00* (2006.01)
(52) U.S. Cl. .................. 455/3.01; 455/150.1
(58) Field of Classification Search .............. 455/150.1, 455/3.01, 158.4, 188.1, 304
   See application file for complete search history.

(56) References Cited

U.S. PATENT DOCUMENTS

| | | | |
|---|---|---|---|
| 4,408,348 A | 10/1983 | Theriault | |
| 6,044,251 A * | 3/2000 | Brekelmans | 455/150.1 |
| 6,493,873 B1 | 12/2002 | Williams | |
| 6,542,203 B1 * | 4/2003 | Shadwell et al. | 348/726 |
| 7,187,913 B1 * | 3/2007 | Rahn et al. | 455/188.1 |
| 7,272,298 B1 * | 9/2007 | Lang et al. | 386/83 |
| 2003/0023981 A1 | 1/2003 | Lemmons | |

* cited by examiner

*Primary Examiner*—Nay A Maung
*Assistant Examiner*—Angelica M Perez
(74) *Attorney, Agent, or Firm*—WPAT, P.C.; Anthony King

(57) ABSTRACT

A system and method for processing a plurality of received signals within a broad signal space concurrently without the need for multiple hardware tuners. The system includes: a signal directing mechanism for routing a transmitted frequency band into the system, the transmitted frequency band includes a plurality of waveforms, each one of the plurality of waveforms contains information; a storage assembly for storing the transmitted frequency band; a selection assembly for selecting at least one waveform from the transmitted frequency band; a processor for processing information corresponding to the at least one waveform; and a presentation device for presenting the information processed from at least one selected waveform to a user.

28 Claims, 4 Drawing Sheets

SOFTWARE SIGNAL RECEIVER

REFERENCE TO RELATED APPLICATION

This application claims the benefit of U.S. Provisional Application No. 60/500,495, filed Sep. 5, 2003.

BACKGROUND FOR THE INVENTION

1. Field of Invention

The present invention relates to the reception and processing of broadcast signals and other electronic signals. More particularly, the present invention provides a means of processing and selecting at least one desired signal from a larger captured band of signals, and may include concurrent processing of multiple signals within the larger captured band of signals.

2. Description of Prior Art

Broadcast signals include a wide array of informational transmissions, which may be distributed either over the air or through cable or other media requiring a physical connection. One illustrative example of such an informational transmission which is available through either an over the air transmission or cable transmissions is television. Traditionally, televisions use a hardwired tuner or other such circuitry to isolate a single frequency within a larger frequency band. These hardwired tuners isolate and amplify one broadcast signal at a time. When a person is watching TV and desires to change the station, the person manipulates the control settings—e.g., the channel knob or remote control channel button—to change the physical characteristics of an oscillator and filter which is typically part of the hardwired tuner within the device. If the TV is equipped with only a single hardwired tuner, it cannot play more than one channel simultaneously. Consequently, in order for a conventional device to simultaneously process or display more than one broadcast signal, the conventional device must have more than one tuner. That is, conventional devices require one tuner, or separate tuner hardware, for each simultaneously displayed station. For example, a typical picture-in-picture television needs at least two tuners, one for the main picture and one for the picture-in-picture display.

FIG. 1 depicts a conventional hardwired television tuner. A radio frequency (RF) signal band 101 is input to a tunable 6 MHz filter 103. The filter 103 removes all but the 6 MHz signal band assigned to a television station. The tunable filter 103 is controlled by a channel selection apparatus 102 which also controls the operation of an oscillator 104. The resulting oscillator signal and filter signal are sent to a mixer 105. From the mixer emerges a 6 MHz wide signal band which corresponds to the selected channel. This signal is traditionally used to drive a television's video and audio functions.

Continuing with the prior illustrative example of television, broadcast signals are available in both analog and digital formats. As used throughout this disclosure, "analog signal", "analog format", "digital signal", and "digital format" are used as shorthand to differentiate different categories of modulation and demodulation techniques. As will be readily understood by those skilled in the art either an "analog signal (format)" or a "digital signal (format)" have analog characteristics, such as rise and fall times for the transmitted signal envelope, upper and lower frequency bounds, and amplitudes (magnitudes) of the transmitted envelope. A traditional analog transmission format, such as frequency modulation (FM) can also be expressed in terms of a digital transmission format of phase modulation.

An "analog signal" may also be viewed as providing baseband information modulated onto a radio frequency using an analog modulation technique. During processing of the received signal, demodulation of the analog modulated baseband signal may be performed either through traditional analog demodulation techniques or through "digitizing" the information utilizing conventional analog-to-digital conversion techniques.

Further, multiple informational transmissions and multiple modulation techniques may be used within a common signal space. The prior illustrative example of television demonstrates one such occurrence of multiple modulation techniques within a common signal space. Using television channel 2, to further refine the example, the following television example provides the following informational transmissions. The overall channel is positioned between 54 and 60 MHz, with a video carrier at 55.25 MHz, a color carrier at 58.83 MHz, and a sound carrier at 59.75 MHz. The composite picture and synchronization signals are amplitude modulated, while the audio is frequency modulated. As will be readily appreciated, if only the audio signal associated with channel 2 is of interest to the user, that signal can be utilized and processed at 59.75 MHz (+/−1000 Hz) independent of the video signal. Similarly, the video signal alone may be utilized without need of processing the audio signal. While in this example the different modulation techniques are separated in frequency, although within the same "channel", a variety of orthogonal signaling techniques may be used to separate information on a common frequency. Illustrative examples of orthogonal signaling techniques include Code Division Multiple Access (CDMA), Direct Sequence Spreading (DSS), and Cyclic Code Shift Keying (CCSK) systems.

SUMMARY OF THE INVENTION

The present inventors recognized that it would be advantageous if a device was capable of processing and presenting multiple broadcast signals simultaneously without requiring additional hardwired tuners to be used. Accordingly, the present invention provides these advantages. Through the use of the present invention, manufacturers of communications devices are able to provide simultaneous multi-display functionality—such as the picture-in-picture feature for TV sets—without incurring the additional expense of multiple hardwired tuners.

The present invention receives a transmitted frequency band containing signal information. The contents of the received frequency band are manipulated into a digital format which may optionally be stored before further processing. After the information from the received frequency band is in the proper digital format, the digital information is accessed by a processor. The processor is able to utilize software algorithms to retrieve the digital information corresponding to a selected frequency (e.g., a particular television channel) or a number of selected frequencies. The digital information corresponding to a selected frequency or frequencies can then be presented to a communications device or other device.

The present invention also allows for concurrent processing of multiple signals, not only for presentation of multiple signals simultaneously, but also for searching the entire received frequency band for pre-selected content. As will be readily appreciated by those skilled in the art, the present invention presents the advantage of being able to concurrently process multiple channels, subsets of channels, and multiple signaling techniques. This level of searching need not be limited to determining the presence or absence of a signal in a portion of the entire received band. If the type of modulation used to modulate a desired baseband signal is known, or can be surmised, then a modulated version of the baseband signal can be synthesized and then be used as a template for searching the entire received band for occurrences of the desired baseband signal. Again, using television as an illustrative example, the entire received band could be searched for all occurrences of the word "Dracula" or a predetermined image associated with "Dracula". The user then could be presented with all programming about "Dracula". This automated selection of content is done without the need for accessing programming databases describing content scheduled to be broadcast in the future, but rather is done on demand based upon the actual content of the entire received band.

DETAILED DESCRIPTION OF THE INVENTION

Figure 1:
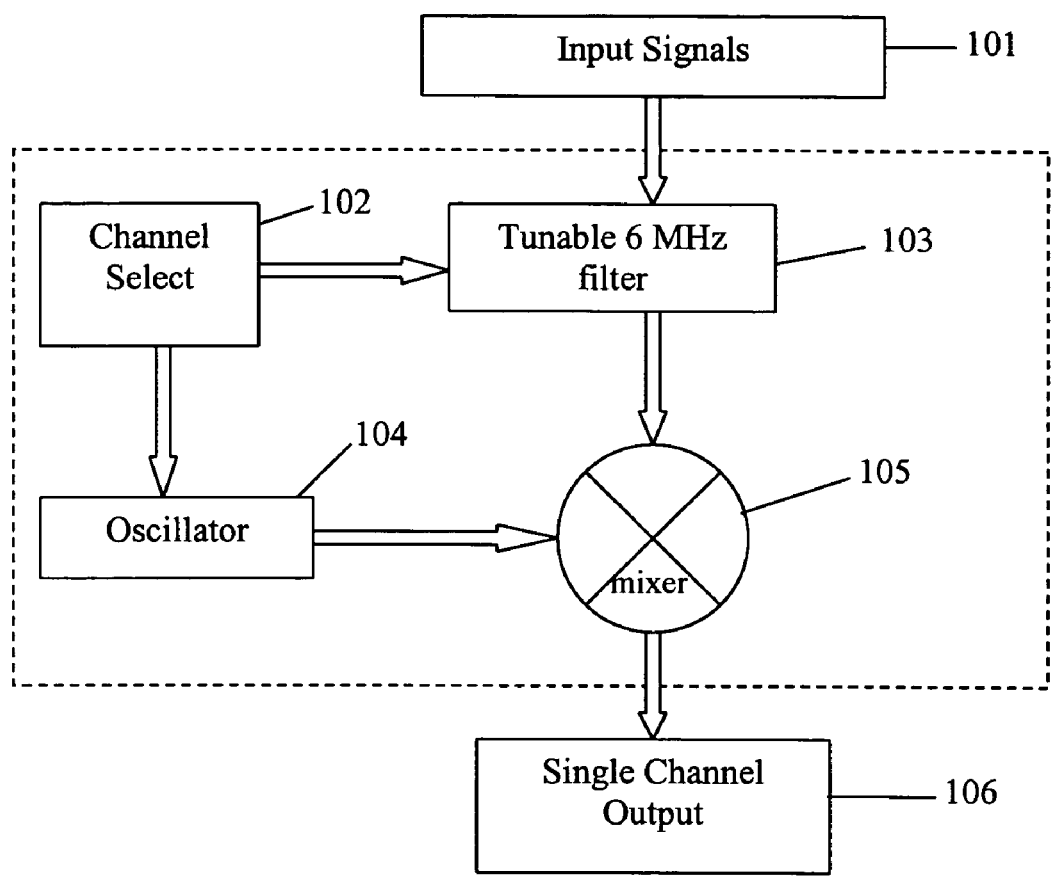
FIG. 1 depicts a conventional hardwired television tuner.

Aspects of the invention will now be described in greater detail in connection with a number of exemplary embodiments. To facilitate an understanding of the invention, some aspects of the invention may be described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both.

Moreover, portions of the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as a "software algorithm configured to" perform a described action or alternatively as "software" that performs a described action, or other such terms.

In accordance with embodiments of the invention, a frequency band is received through a receiving device such as an antenna or wire. The information contained in the received frequency band is then made available to software algorithms for processing. When the present invention receives a frequency band containing analog signals, an analog to digital (A/D) converter may be used to convert the analog signal into digital information. When a digital signal is available directly, the use of an A/D converter is generally not necessary. The digital information corresponding to the entire received frequency band is processed using software algorithms. This digital information corresponding to the received frequency band is made available to communications devices. This allows for multiple display of any desired information within the received frequency band.

The present invention may be practiced with television, radio, or other like types of video, audio or informational signals which are broadcast or transmitted. As an example of an embodiment, a radio station may broadcast at a particular frequency, for instance, 103.5 MHz. Should a listener wish to listen to the content of the radio station being communicated on the 103.5 MHz frequency, the listener selects the frequency assigned to the desired station, in this case 103.5 MHz. An antenna receives multiple waveforms of all the various broadcast radio stations within transmission range, including the 103.5 MHz frequency waveform. For example, the antenna of a typical frequency modulated (FM) radio may receive signals from a range of 88 MHz to 107 MHz. The multiple waveforms, including the 103.5 MHz frequency, are communicated from the receiving antenna to the processor, with some signal processing optionally taking place on the receive signal. Because conventional radio signals are presently broadcast in an analog format, an A/D converter is used to convert the entire received frequency band into digital information. Software algorithms are then used to retrieve the digital information corresponding to the 103.5 MHz frequency. This information is provided to an audio output apparatus in order for the user to hear the station. Additionally, several stations can be selected simultaneously. Software algorithms may be used to retrieve the digital information corresponding to the selected stations from the digital information corresponding to the received frequency band simultaneously. The selected information broadcast by the stations can then be presented simultaneously.

By eliminating the bottleneck created by the conventional hardware tuner's inability to process multiple frequencies, the present invention overcomes the disadvantage of conventional systems which require a separate hardwired tuner for each channel to be simultaneously presented. When applied to a video display device, such a process enables the device to display multiple pictures without the need for multiple hardware tuners. The number of pictures displayed may be limited only by the processor computing and memory specifications, rather than the number of hardware tuners.

Figure 2:
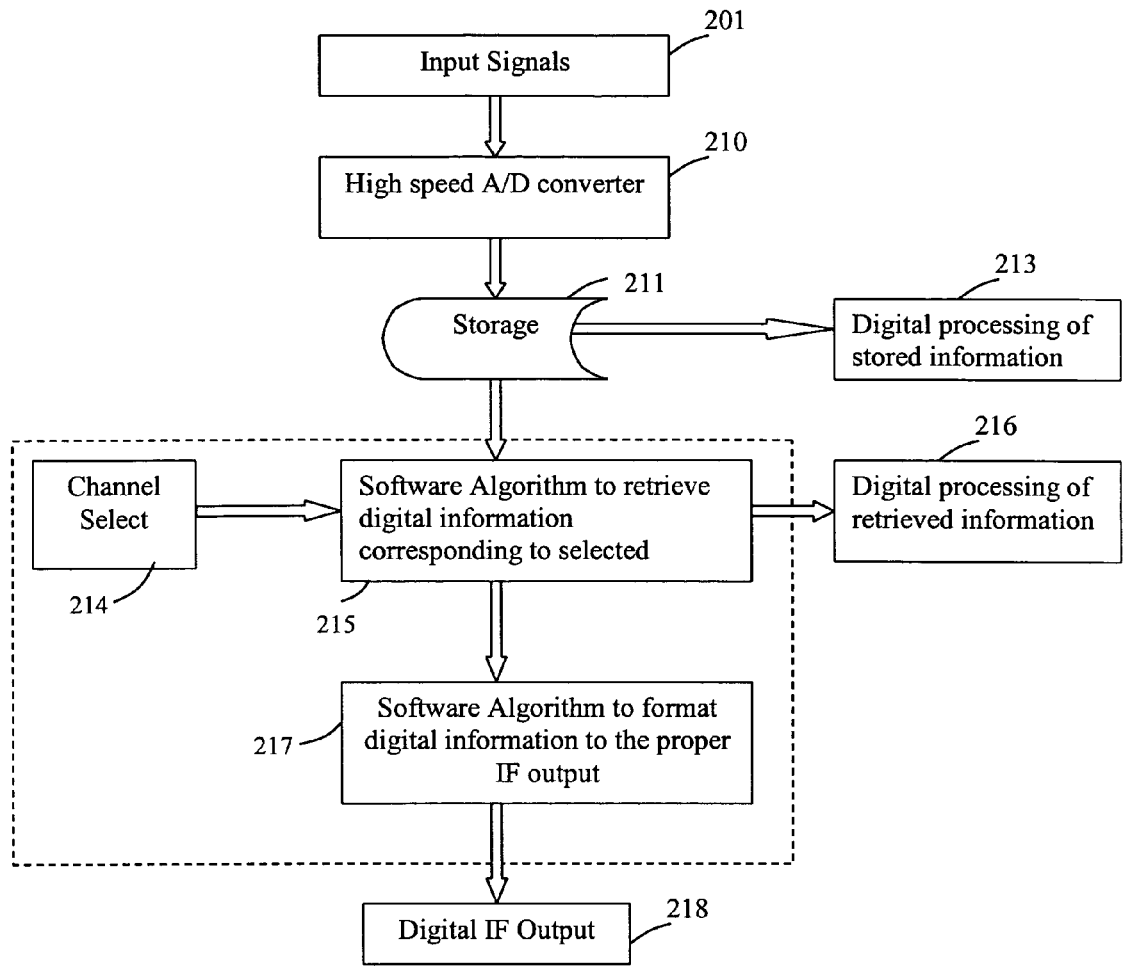
FIG. 2 depicts an exemplary system which may be used to practice the present invention.

FIG. 2 depicts an exemplary system which may be used to practice the present invention. FIG. 2 illustrates some of the differences of the present invention as compared to the use of conventional hardware television tuners, e.g., that shown in FIG. 1. By comparing FIG. 2 with the conventional tuner circuitry of FIG. 1 it can be seen that the filter 103, oscillator 104, and mixer 105 components of the conventional tuner have been removed, or otherwise reconfigured. In the embodiment of the invention depicted in FIG. 2 the software algorithms 213-217 are used to retrieve information corresponding to selected channels and put it in a format for transport to an apparatus for display or further processing. These modifications allow for the digital output of multiple channels without the requirement to have a separate hardwired tuner for each output.

Take as an example a software tuner that is configured to receive analog television frequency signals between 54 MHz and 812 MHz. Once received at block 201, the analog frequency band between 54 and 812 MHz is digitized at block 210 using an A/D converter. This digital information, which corresponds to the entire received frequency band of 54 to 812 MHz, can then be stored in accordance with block 211, or otherwise processed or communicated in accordance with block 213. The storage 211 may be a semiconductor type storage (e.g., memory chips), or an optical (e.g., CD or DVD) or magnetic type (e.g., diskette or tape) storage media, or like type of storage known to those of skill in the art. When a station is selected for display in block 214, software algorithms are used to process and select the digital information comprising content associated with the selected station is retrieve from within the digital information corresponding to the entire frequency band in accordance with blocks 215 and 216. The processed information may then be formatted for IF output in accordance with block 217, and then provided as a digital output in block 218. Alternately, the processed information may be formatted as a baseband signal. The digital output of 218 may be further processed to be in a format suitable for a human user, e.g., in a viewable video format for displaying on a TV screen or other display device. Because the entire received frequency band is in a digital format, the entire spectrum of received information can simultaneously be made available to multiple processes, thus enabling the display of multiple stations at the same time without requiring a hardwired tuner for each displayed station. This is advantageous over conventional hardware tuners which are capable of amplifying only one desired frequency at a time.

Currently, some television stations, cable companies, and satellite service providers are broadcasting digital signals. The process used to encode and transmit the desired information is described in U.S. Pat. No. 6,542,203, which is hereby incorporated by reference in its entirety. The Background section of the '203 patent generally explains, among other things, the steps taken, and formats available, for broadcasting digital signals. In some embodiments of the present invention the frequency band containing the digital signal is received through wire or over the air. The digital information, including one or more selected television stations, may be retrieved from the received frequency band. An A/D converter may not be necessary when receiving a digital signal. However there may be instances where it is advantageous to process some portion of the received frequency band containing digital information through an A/D converter. In the case of a television signal, the digital information corresponding to the small frequency band (usually a 6 MHz band) defined for a television station's use is retrieved. That is, the digital information corresponding to the desired broadcast channel is retrieved. If two or more channels are desired, then the digital information corresponding to the two or more channels desired broadcast channel is retrieved. Additionally, the processor can use software algorithms to manipulate the information from the received frequency band to perform other functions not related to communications, such as filtering, noise reduction routines, error correction, or other like types of signal processing operations.

Figure 3:
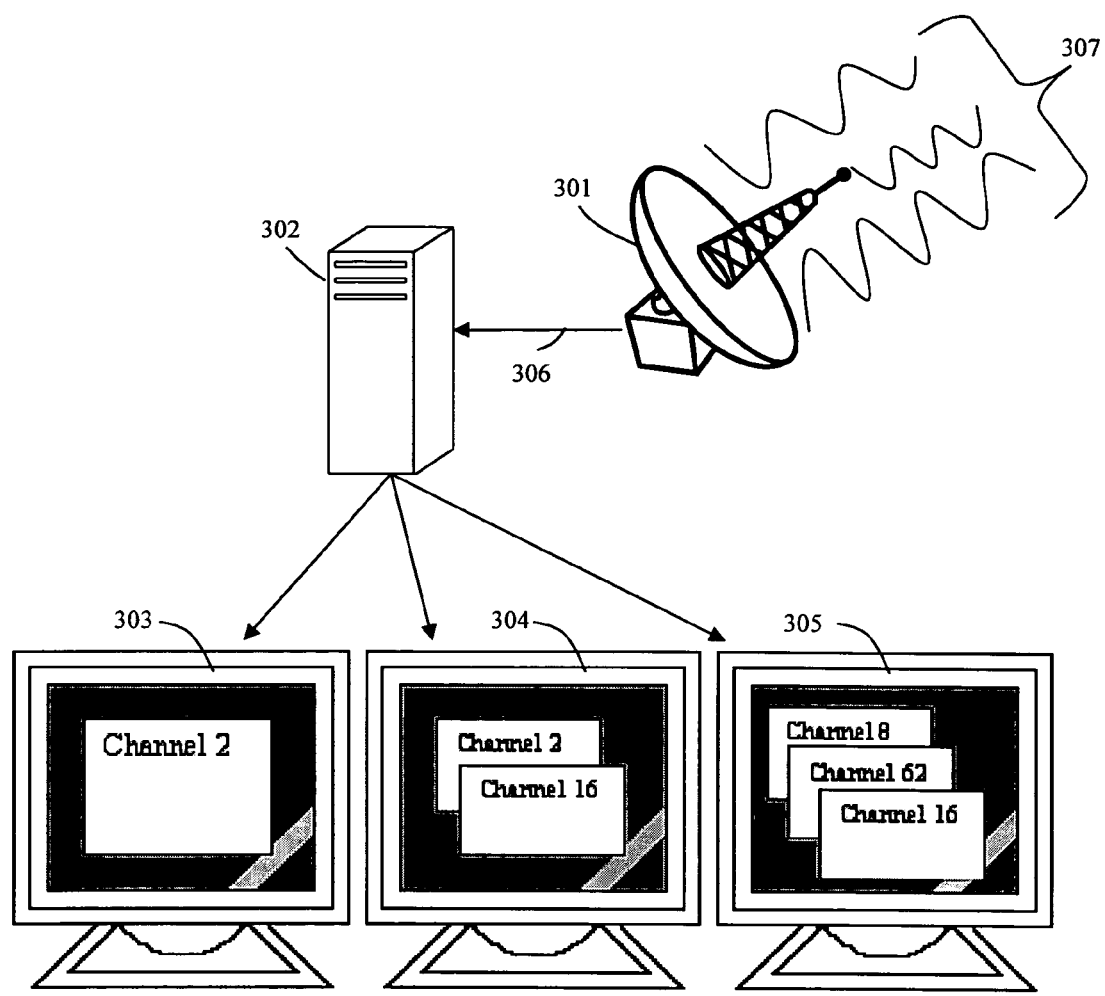
FIG. 3 depicts a system according to an embodiment of the invention.

FIG. 3 depicts a system according to an embodiment of the invention. A transmitted frequency band containing digital information 307 is received by an apparatus such as the antenna 301. The frequency band generally consists of multiple waveforms. The term "waveform," as used herein, is intended to mean the signals associated with a particular channel; e.g., a television channel or a radio station's channel. It is understood that a particular channel is generally not broadcast at exactly one frequency. A channel is centered at a single frequency, but covers a relatively narrow range which is generally broader than a single frequency. Therefore, the term "waveform" is used to describe the transmitted signals associated with a particular channel. A waveform may be thought of as the signals associated with one frequency or channel of a broadcaster or transmitter. As such, embodiments of the present invention can be used to receive waveform information transmitted for the purposes of reception such as television broadcasts, two-way communications, data transfer, or the like. The usage of the term "transmitted" in the present context is intended to mean the propagation of a waveform through a medium (e.g., through free space, air, coaxial cable, fiber optic cable, or the like).

The received frequency band 307 containing analog and/or digital information is communicated to a processor 302 via air or wire transmission techniques 306. The received frequency band may be communicated directly to the processor 302 (with or without preprocessing) or may be buffered or stored before being sent to processor 302. If the received frequency band contains analog information (baseband information placed onto the radio frequency signal using analog modulation techniques) an A/D converter may be used to convert the analog information into digital information. Generally, if frequencies received by the present invention are in a digital format no A/D conversion is necessary. Once the user has selected a desired channel, the processor 302 uses software algorithms to retrieve information corresponding to the waveform associated with the selected channel from the digital information corresponding to the received frequency band. This digital information corresponding to the selected one or more waveforms is then transmitted to the communications devices 303-305. The communications devices 303-305 may be television sets, computers, personal digital assistants (PDAs), radios (producing sound rather than displaying an image), or other like types to telecommunication devices or consumer electronics devices, or any combination thereof. The communications device 303 is shown displaying information contained on one desired channel. The communications devices 304 and 305 are depicted displaying multiple channels simultaneously.

Figure 4:
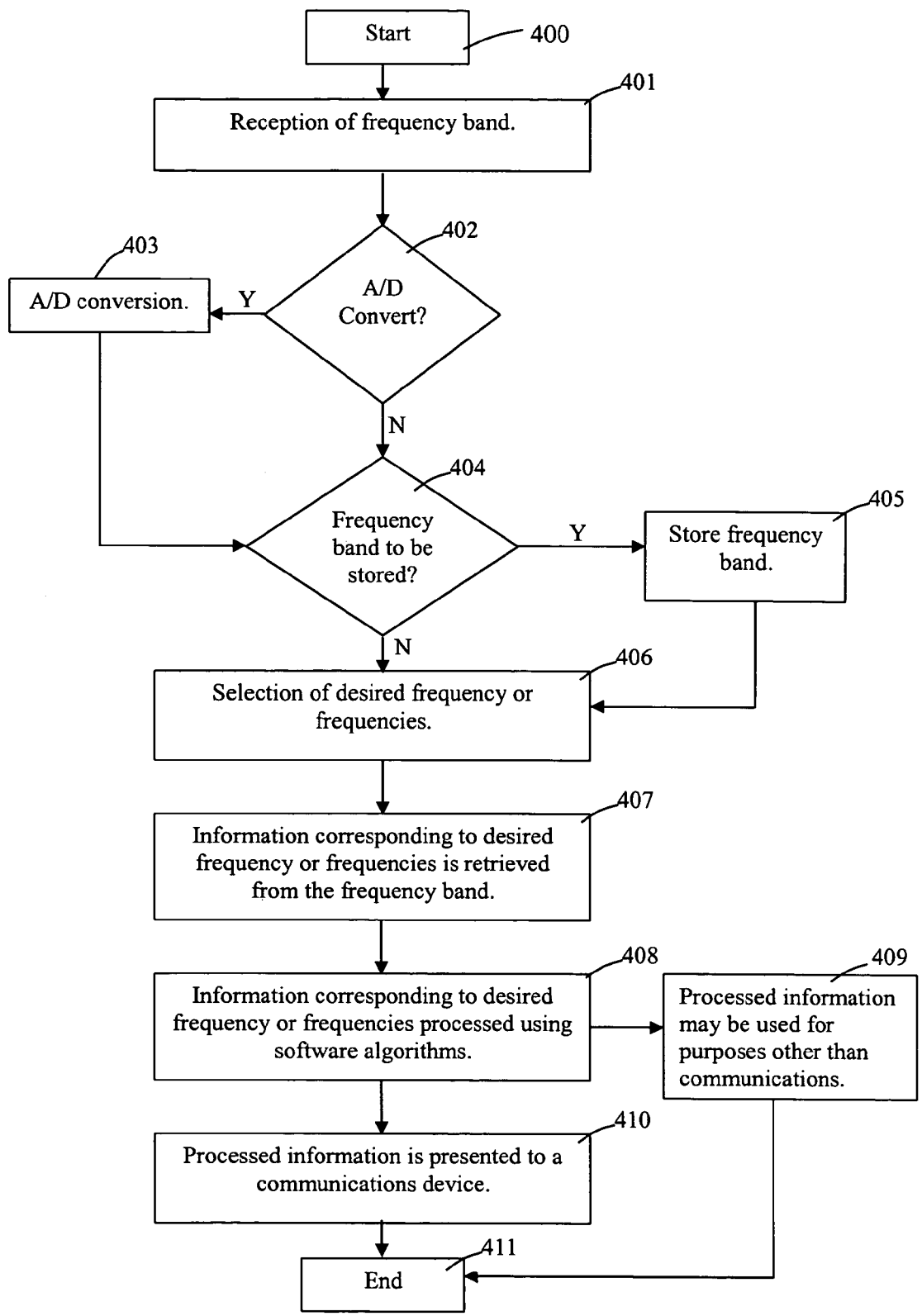
FIG. 4 is a block diagram of an embodiment of the present invention.

FIG. 4 is a block diagram of an embodiment of the present invention. The present invention consists of receiving a frequency band at step 401 by, for example, an antenna such as the antenna 307 of FIG. 3. Once the frequency band has been received or otherwise detected by the antenna 301 in step 401, it is then provided to a processor and the method may proceed to step 402.

Where analog signals are received, the present invention may incorporate A/D conversion techniques. Step 402 shows the possible need for A/D conversion. Should there be a need for A/D conversion, the analog information is converted to digital information through the use of an A/D converter 403. Once in a digital format, the information can be accessed by multiple digital processes simultaneously. Therefore, the digital information corresponding to multiple frequencies can be displayed and/or processed simultaneously. Once the frequency band is in the proper digital format, there may be a need to store the digital information corresponding to the received frequency band.

After step 402 it may be advantageous to store the digital information corresponding to the received frequency band as in step 405. Storage of the digital information corresponding to the received frequency band in step 405 is necessary at this time because it is difficult to economically process such large amounts of data on the fly using current processors. Presently, embodiments receiving large frequency bands need to store the digital information corresponding to the received frequency band either in a temporary memory cache such as RAM or more permanent storages such as on a hard disk. As advances in computer processors are realized, and faster processors become more affordable, the step of storing the digital information corresponding to the received signal may not be necessary. It is also recognized that it may be advantageous to store the digital information at various stages of this process. For example, the processed digital information corresponding to the selected frequencies can be stored for access at a later time or to enable processing by additional software algorithms.

In step 406 a frequency or frequencies is selected for display or processing. Traditional methods of selecting frequencies such as rotating knobs, push buttons, graphical user interface (GUI) displays, keyboards, keypads, program guides, and the like can be used to select a frequency. Additionally, it is not necessary for a specific frequency or frequencies to be selected. Channels that have been defined as certain frequencies can also be selected as is common usage on conventional television sets (the user does not select a frequency, but rather selects a channel). In an alternative embodiment, the selected frequencies may be all the frequencies associated with a particular type of broadcasting; e.g., all the FM frequencies or all the TV channels associated with broadcast television. Once the frequency has been selected, the method may proceed to step 407. In step 407 software algorithms use the selections of step 406 to retrieve information corresponding to the selected frequency or frequencies from the digital information corresponding to the received frequency band. Once the digital information corresponding to the selected frequency or frequencies is retrieved, the method proceeds to step 408 where the selected frequency or frequencies can be used in multiple ways. Most notably, in accordance with step 410 the digital information can be presented to a communications apparatus to provide a manner to display the information contained on the desired frequency or frequencies.

It should be noted that the present invention is not limited to being used for receiving signals broadcast by humans for the purposes of being received. The present invention can be practiced in scientific instrumentation for receiving or measuring waveforms transmitted by inert objects or cosmic occurrences. Examples of such waveforms transmitted with no intent for reception are waveforms originating from subatomic particles, celestial bodies, shifting tectonic plates, or the like. As such the present invention can be utilized to enhance apparatus arranged for purposes other than communications.

While most of the language in this document will illuminate the invention's usefulness when used in relation with communications devices, it is recognized the digital information corresponding to the frequency band can be used for applications other than communication. Such language is not meant to limit the present's inventions application in areas other than communications devices.

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

We claim:

1. A system for processing a broadcast signal including a plurality of different information broadcast channels, said system comprising:
a means for receiving a transmitted frequency band into said system, the transmitted frequency band including a plurality of waveforms, each of said waveforms corresponding to a different one of said information broadcast channels;
an analog to digital converter configured to convert said plurality of waveforms from an analog format to a digital format if said transmitted frequency band is received in an analog format, said analog to digital converter outputting digital information for each of said information broadcast channels;
a storage device configured to store digital information representing each of said plurality of waveforms of said transmitted frequency band;
a searching means for searching the entire received frequency band for pre-selected content;
a selector configured to select multiple waveforms simultaneously from said plurality of waveforms of said frequency band stored in the storage for concurrently accessing information in selected information broadcast channels corresponding to each one of said multiple waveforms without using a separate tuner for each of said channels;
a means for processing information corresponding to said information in said selected information broadcast channels retrieved from the storage; and
a means for presenting said information to a user,
wherein when a type of modulation used to modulate a desired baseband signal is known or surmised, then a modulated version of the baseband signal is synthesized and then be used as a template for searching the entire received frequency band for occurrences of the desired baseband signal.

2. The system of claim 1, wherein said means for receiving a transmitted frequency band is an antenna or a wired connection coupled to a signal distribution means.

3. The system of claim 1 wherein said transmitted frequency band includes the plurality of waveforms corresponding to the broadcast channels on frequencies between approximately 54 MHz and approximately 812 MHz, and wherein the storage means is configured to store the digital information for the broadcast channels on frequencies between approximately 54 MHz and approximately 812 MHz.

4. The system of claim 3 wherein the analog to digital converter is configured to convert the entire received frequency band.

5. A system for processing a broadcast signal including a plurality of different information broadcast channels, said system comprising:
a signal directing means for routing a transmitted frequency band into said system, the transmitted frequency band having the plurality of information broadcast channels therein, each one of said plurality of information broadcast channels having information contained therein;
a storage means for storing the transmitted frequency band;
a searching means for searching the entire transmitted frequency band for pre-selected content;
a selection means for selecting at least one information broadcast channel from said transmitted frequency band stored in the storage means;
a means for processing information corresponding to said at least one information broadcast channel retrieved from the storage means; and
a means for presenting said information to a user,
wherein said routing, said storage, and said selecting of the plurality of information broadcast channels are each performed on said plurality of information broadcast channels concurrently without using separate hardware tuners for each one of said plurality of information broadcast channels,
wherein when a type of modulation used to modulate a desired baseband signal is known or surmised, then a modulated version of the baseband signal is synthesized and then be used as a template for searching the entire transmitted frequency band for occurrences of the desired baseband signal.

6. The system of claim 5, wherein the searching means for searching said transmitted frequency band for a subset of information corresponding to at least one search criterion.

7. The system of claim 6, wherein said subset of information corresponding to said at least one search criterion is presented to a user.

8. The system of claim 6, wherein said searching means searches each of the information broadcast channels of the transmitted frequency band stored by said storage means.

9. The system of claim 6, wherein said searching means searches the transmitted frequency band prior to storage of the transmitted frequency band by said storage means.

10. The system of claim 6, wherein said searching means searches the transmitted frequency band concurrent with storage of the transmitted frequency band by said storage means.

11. The system of claim 6, wherein said searching means searches the information after the information has been processed by said means for processing.

12. The system of claim 6, wherein said means for processing further includes an analog-to-digital conversion means for creating a digitized version of information modulated onto at least one waveform with an analog technique.

13. The system of claim 12, wherein said storage means stores said digitized version of said information modulated on at least one waveform with an analog technique.

14. The system of claim 5, wherein said means for presenting said information is a video display.

15. The system of claim 5, wherein said means for presenting said information is an audio presentation device.

16. The system of claim 5, wherein said means for processing information processes the plurality of information broadcast channels concurrently.

17. The system of claim 5, wherein at least a portion of said selection means being implemented as program instructions executed by a processor for selecting the at least one information broadcast channel from said transmitted frequency band.

18. The system of claim 5, wherein at least a portion of said means for processing information is implemented program instructions executed by a processor for processing information corresponding to said at least one information broadcast channel.

19. A system for processing an analog broadcast signal including a plurality of different analog frequency bands, said system comprising:
    a unit for receiving the analog broadcast signal;
    an analog to digital conversion unit for converting the plurality of analog frequency bands into digital information;
    a storage unit storing the digital information converted from the analog frequency bands;
    a searching unit for searching the entire received frequency band for pre-selected content;
    a selection unit for selecting at least one set of digital information corresponding to a signal frequency from said frequency bands stored in the storage unit;
    a processor for executing program instructions when executed by a first process being capable of retrieving from the storage unit said digital information corresponding to a signal frequency from the digital information corresponding to said frequency bands;
    the processor also for executing program instructions when executed by a second process being capable of processing said digital information signal frequency retrieved from the storage unit; and
    a communications device for communicating said processed digital information to another device,
    wherein said conversion, storage, and selection are performed on each of said channels without using separate hardware tuners for said different analog frequency bands,
    wherein when a type of modulation used to modulate a desired baseband signal is known or surmised, then a modulated version of the baseband signal is synthesized and then be used as a template for searching the entire received frequency band for occurrences of the desired baseband signal.

20. A method of processing a plurality of simultaneously received broadcast signals comprising:
    receiving a frequency band comprising a plurality of waveforms, each of the plurality of waveforms comprising content respectively associated with a station;
    storing each of the plurality of waveforms of the frequency band in a storage means;
    searching the entire received frequency band for pre-selected content;
    selecting from said frequency band stored in the storage means at least two of said plurality of waveforms comprising a first waveform and a second waveform;
    retrieving from the frequency band stored in the storage means, information corresponding to the first waveform and the second waveform;
    processing simultaneously said information corresponding to the first waveform and the second waveform; and
    presenting, in a format suitable for human user, content associated with the first waveform and content associated with a second waveform,
    wherein said method is performed on said first channel and said second channel concurrently without the use of separate hardware tuners for tuning said first waveform and said second waveform,
    wherein when a type of modulation used to modulate a desired baseband signal is known or surmised, then a modulated version of the baseband signal is synthesized and then be used as a template for searching the entire received frequency band for occurrences of the desired baseband signal.

21. The method of claim 20, further comprising providing at least one search criterion and searching the frequency band for content associated with said at least one search criterion.

22. The method according to claim 20, wherein the storing step further comprises storing the frequency band before the first waveform and the second waveform have been processed.

23. A system for processing a broadcast signal including a plurality of different information broadcast channels each operating on a different carrier frequency, said system comprising:
    a receiver for receiving said broadcast signal into said system, the received broadcast signal including said plurality of information broadcast channels;
    a signal processing device for processing transmitted frequency band including processing information of said plurality of information broadcast channels without first tuning to any one of said information broadcast channels;
    a storage device configured to store a result of said processing of said transmitted frequency band by said signal processing device;
    a searching unit for searching the entire received frequency band for pre-selected content;
    a selector configured to select said plurality of information broadcast channels from said stored result for concurrently accessing information in said selected information broadcast channels corresponding to each one of said multiple waveforms without using a separate tuner for each of said channels;

a processor for processing said information accessed by said selector; and an output device for presenting said information to a user,
wherein when a type of modulation used to modulate a desired baseband signal is known or surmised, then a modulated version of the baseband signal is synthesized and then be used as a template for searching the entire received frequency band for occurrences of the desired baseband signal.

24. The system of claim 23, wherein said signal processing device is an analog to digital converter for converting the transmitted frequency band that is analog into a digital format.

25. The system of claim 23, wherein the analog to digital converter is configured to convert the entire received frequency band.

26. The system of claim 23, wherein said selector selects a plurality of said channels, and wherein said processor processes information from the selected information broadcast channels concurrently.

27. A method of processing a plurality of simultaneously received broadcast signals comprising the steps of:

receiving a frequency band comprising a plurality of channels, each of the plurality of channels comprising content respectively associated with a station;

storing each of the plurality of channels of the frequency band in a storage means;

searching the entire received frequency band for pre-selected content;

retrieving from the frequency band stored in the storage means, information corresponding to a selected two or more of said channels;

processing simultaneously said information corresponding to the selected two or more of said channels; and presenting, in a format suitable for human user, content associated with said selected two or more of said channels, wherein said method is concurrently performed on said selected two or more of said channels without the use of a separate hardware tuner for tuning each one of said selected two or more channels, wherein when a type of modulation used to modulate a desired baseband signal is known or surmised, then a modulated version of the baseband signal is synthesized and then be used as a template for searching the entire received frequency band for occurrences of the desired baseband signal.

28. The method of claim 27, further comprising the step of providing at least one search criterion and searching the selected two or more channels for content associated with said at least one search criterion.

* * * * *